United States Patent [19]
Staranick et al.

[11] 3,866,777
[45] Feb. 18, 1975

[54] SPARE TIRE CARRIER

[76] Inventors: Steve Staranick, 2062 Mori Ln., Orange, Calif. 94087; Jerome R. Garrison, 7931 Orangewood, Stanton, Calif. 90680

[22] Filed: Dec. 20, 1973

[21] Appl. No.: 426,876

[52] U.S. Cl............ 214/454, 224/42.06, 224/42.21
[51] Int. Cl............................................. B62d 43/00
[58] Field of Search .......... 214/451, 454, 452, 453; 224/42.06, 42.12, 42.21, 42.23, 42.24, 42.08

[56] References Cited
UNITED STATES PATENTS

| | | | |
|---|---|---|---|
| 1,419,965 | 6/1922 | Gerrie | 214/452 |
| 2,991,894 | 7/1961 | Walker | 214/454 |
| 3,343,736 | 9/1967 | Sellers | 224/42.06 |
| 3,669,326 | 6/1972 | Podraza | 214/454 |
| 3,700,130 | 10/1972 | Holdread | 214/454 |
| 3,753,520 | 8/1973 | Bodde | 224/42.06 |

*Primary Examiner*—Robert J. Spar
*Assistant Examiner*—Jerold M. Forsberg
*Attorney, Agent, or Firm*—Grover A. Frater

[57] ABSTRACT

Spare wheel handling is aided by a counter weight structure in which an arm on which the spare wheel is carried is pivoted on a second member arranged for attachment to a vehicle. The "counter weight" is a spring in which energy is stored when the wheel is lower. The arrangement of the members and the spring includes several features which contribute to easy reliable operation. One of these features is the use of a cable and pulley structure which permits use of a long spring and modification of the rate of energy storage per increment of wheel position change.

5 Claims, 5 Drawing Figures

PATENTED FEB 18 1975 3,866,777
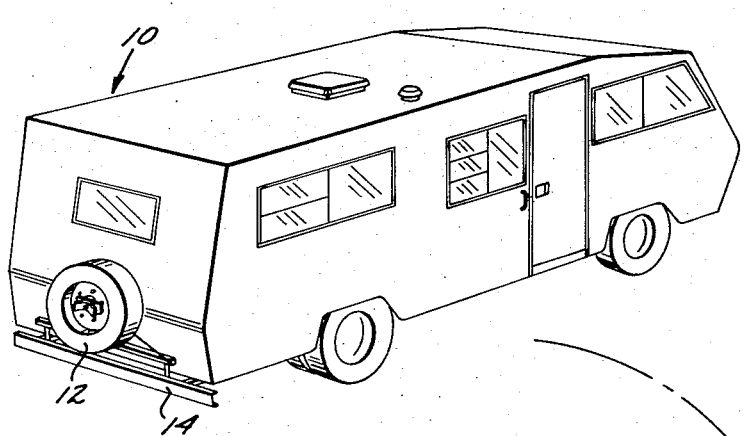
FIG.1
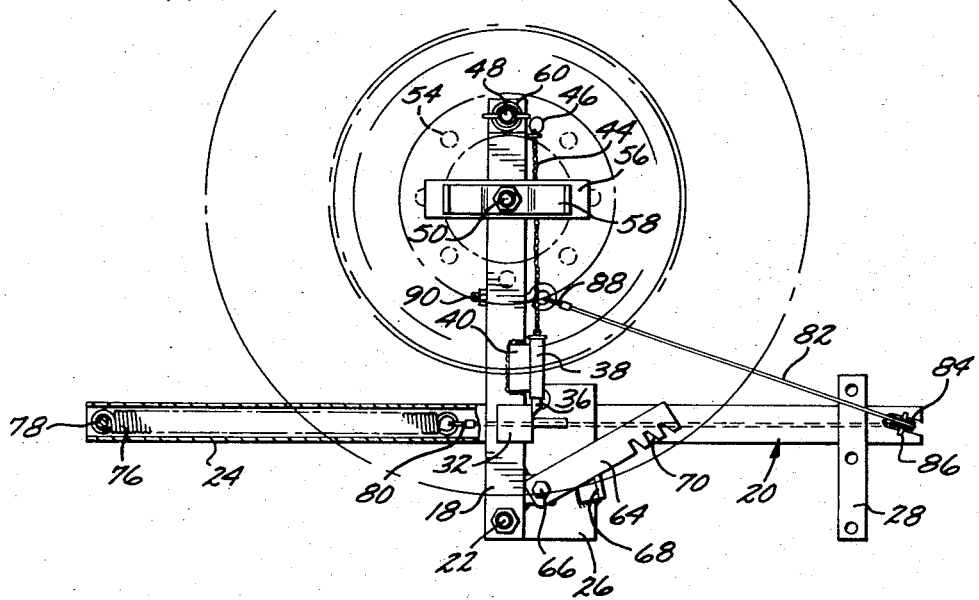
FIG.2
FIG.3
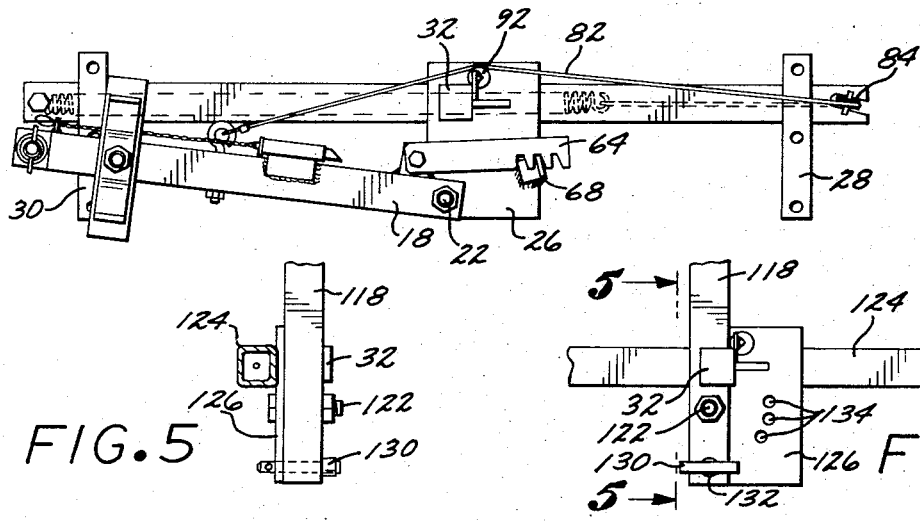
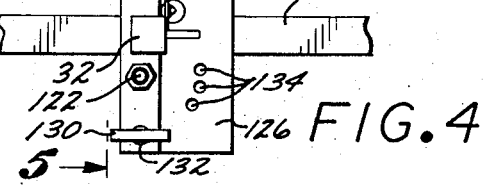
FIG.5   FIG.4

SPARE TIRE CARRIER

This invention relates to improvements in apparatus for handling spare wheels.

In certain kinds of vehicles, particularly in the case of trucks and recreational vehicles, the spare wheel is very difficult to mount on and remove from its storage point. The spare wheel is often very heavy. In the case of an ordinary motor home the wheel may weigh as much as 175 pounds or more, and circumstances may dictate that it be mounted on the vehicle at a point three or four feet or more from the ground. To lift the wheel that high requires a lifting motion such that the weight after first being lifted by upward movement of the arms, must be hoisted to a position in which it is pushed upwardly. The transition from one of those positions to the other is difficult, too difficult for many persons who might have occasion to change a wheel.

It is an object of the invention to provide an improved apparatus of the kind in which a spring force is used to counter the weight of the spare tire, both when lowering it from a mounting position and when lifting it to that position.

It is an object of the invention to provide an apparatus of that kind which is easily operated, which may be operated with safety, and which can be manufactured in an embodiment that is suitable for use with a wide variety of motor vehicle forms and mounting arrangements.

These objects and advantages, and others that will become apparent upon examination of the specification which follows, are accomplished in the invention by the provision of a counterbalance structure that includes two members, one of which is a pivoting arm. One end of the arm carries a mounting means by which the wheel is mounted. The second member is arranged for fixed mounting on the vehicle. The first member is pivotally mounted on the second so that it may move from a first storage position in which the spare wheel is stored to a second work position at which the spare wheel is easily removed and attached. The invention includes a means for biasing the first member to the storage position. While the invention is not limited to coiled spring bias, use of such a spring is preferred. It is employed such that energy is stored in the spring when the spare wheel is lowered by movement of the pivoted member from its first to its second position. A lock prevents release of the spring's energy when the wheel, and the wheel weight, are removed from the arm. After the wheel is replaced, or another substituted for it, the lock is released and the energy stored in the spring is available to help lift the spare wheel back to the storage position by rotating the pivoted member back to its first position.

The invention is applicable to those situations in which the spare wheel is to be stored in an elevated position. It is mounted on a pivoting member, and as that member is pivoted, the proportion of the spare wheel's weight which is applied as a vertical component to the pivot point changes. It decreases with the degree of rotation of the first member on the second. Thus, the proportion of the wheel's weight that is not carried by the pivot pin changes with the rotational position of the pivoted member or arm. The apparatus is arranged so that the degree of extension of the counterbalance spring is approximately proportional to the portion of the spare wheel's weight that is not borne by the pivot pin of the first member. Since the spring obeys Hooke's Law, the force stored in the spring is proportional to the degree in which the weight of the wheel is not borne by the pivot pin of the arm. Thus, the spring counterbalances most or all of the wheel's weight after the arm is pivoted through a small arc and the bias to hold it in storage position is overcome.

One of the objects of the invention, as described above, is to provide a structure which is applicable to a wide range of vehicle types and spare wheel weights without a need for custom modification. This object is realized in the invention by a construction in which the spring force is applied between a point on the second member which lies substantially to one side of the first member, or pivoted arm, when that arm has its first storage position, and a point on the first arm that lies intermediate the pivot and the point, called the mounting point where the center of gravity of the spare wheel is to be fixed to the pivoted arm. In the preferred form, the structure is arranged so that a long coiled spring may be used. A long spring has the advantage that it can be made mechanically stronger than can a shorter spring with the same spring rate and same degree of extension.

In the preferred form of the invention, the second member is made in elongated form. One end of the spring is connected to the second member, and the end of the spring is connected to a pliant member, such as a cable. The cable extends from the spring to and over a fixed or rolling pulley to a connection with the pivoted arm. That arrangement has a number of advantages. Making the second member long makes it possible to arrange mounting on the vehicle at widely spaced points for increased rigidity and stability. Making that second member long also permits its being used to protect the counterweight spring. It means that a long spring may be used. In addition, the fact that a cable or other pliant element is used in connecting the spring to the pivoting arm makes it convenient to change the rate at which energy is stored in the spring as an incident by rotation of the pivoted arm over different segments of the pivotal movement. This is done by adding elements which change the cable direction over a segment of arm rotation such that the "purchase" or mechanical advantage of the arm movement and spring extension is changed.

The preferred construction is shown in the drawings. The pivoted arm, or first member, is arranged so that it pivots between a vertical and a substantially horizontal position. The vertical position is the storage position, and the horizontal position is the work position that it occupies when the spare wheel is removed from the arm or is attached to it.

IN THE DRAWINGS

FIG. 1 is a pictorial view of a recreational vehicle on the rear of which is mounted a spare wheel and a spare wheel handling apparatus which embodies the invention;

FIG. 2 is a view, partly in section and partly in front elevation, of the spare wheel handling structure shown in FIG. 1, the wheel being shown in phantom lines to illustrate how it is associated with the handling apparatus;

FIG. 3 is a view in front elevation of the wheel handling structure shown with its pivoted arm in the work position;

FIG. 4 is a fragmentary view of an alternative form of apparatus showing a different locking arrangement; and FIG. 5 is a sectional view taken on line 5—5 of FIG. 4.

The mobile home unit 10 of FIG. 1 has its spare wheel and tire 12 mounted at the rear of the vehicle on a spare tire mount which is bolted to the frame so that it is positioned horizontally above the rear bumper 14. Thus arranged, the spare wheel and tire has its center located approximately three and one half feet above the ground level. When it is desired to remove that spare wheel, a lock on the handling structure is unlatched. The spare wheel will remain in the position it is shown to occupy in FIG. 1 until lateral force is applied to begin rotation of a pivoted arm on which the wheel is mounted. In the embodiment illustrated, that lateral force would be a push toward the left side of the vehicle 10.

The weight of the wheel and pivoted arm is counterbalanced so that only a relatively small force is required to rotate the pivoted arm until the wheel has reached a position in which the lower part of its tire is but a few inches from ground level. If the apparatus is properly adjusted relative to the weight of the spare wheel and tire, only a very small force will be required to hold the wheel in that position. The apparatus is arranged so that any further downward movement requires a force that is increased in small degree. The wheel having moved downwardly to the desired position, it is necessary only to lock the handling apparatus so that upward movement is precluded. In fact, the lock is gravity actuated so that locking is automatic after the tire has been lowered to a point near ground level.

The handling apparatus is shown in two operating conditions in FIGS. 2 and 3. The unit consists of two primary members, the first member 18 is called a pivoted arm. It is pivoted on the second member 20 at a pivot pin 22. The second member is an elongated structure arranged for fixed mounting on the vehicle. In this embodiment it comprises a rectangular tube 24, a downwardly extending pivot plate 26 which is fixed as by welding to the mid-region of the tube 24, and a pair of end brackets 28 and 30 (see FIG. 3) which are welded to the tube 24 and which serve as mounting hardware by which the second member is bolted to the frame of the vehicle with which it is associated. The details of that mounting hardware will vary from installation to installation. In FIG. 1 the mounting brackets 28 and 30 are bolted to brackets which are not visible in the drawing, but which extend upwardly from the vehicle's frame between the body and the rear bumper.

The pivot arm 18 occupies its upright or first position in FIG. 2. This is the position it has when the spare wheel is in its storage position. The arm 18 is prevented from clockwise rotation from the position it is shown to occupy in FIG. 2 by an L-shaped stop 32 which is welded to the pivot plate 26 and opens to the left in FIG. 2. The right side of that member 32, as seen in FIGS. 2 and 3, serves as the keeper for a bolt 36 that is spring biased to extended position from a bolt housing 38. The housing 38 is welded by a plate 40 to the pivot arm 18. A chain 44 extends upwardly from the rear end of the bolt through a bracket which is secured to arm 18 near its upper end. Above that bracket the chain terminates in a pull ring 46. The keeper and bolt 36 serve to lock the arm 18 against counterclockwise rotation until the ring 46 is pulled upwardly to retract the keeper 36. It must remain retracted until the arm 18 is rotated enough to carry keeper 36 clear of the L-shaped stop 32.

The phantom lines in FIG. 2 illustrate how the spare wheel is mounted on the arm 18. The mounting means in this embodiment comprises two studs 48 and 50 which extend in like direction on parallel lines forwardly from the arm 18. For the purpose of this explanation, what is seen when looking at the handling unit toward the rear of the vehicle 10 is the front of the handling unit.

Stud 48 is shorter than stud 50 as best shown in FIG. 1. The two studs extend parallel to the axis of the pivot pin 22 in this embodiment so that the spare wheel is removed by pulling it away from the vehicle 10. The stud 48 extends through one of the mounting bolt holes of the spare wheel, one of which is identified by the reference numberal 54. The other stud extends through the center opening of the wheel. On it are mounted a clamp 56, which is wide enough to span the central opening of the wheel, and a large wing nut 58. That wing nut is sufficiently large and heavy so that it may be struck with a hammer to tighten and loosen it. A smaller wing nut 60 is threaded on the end of stud 48. It is intended that the smaller one be turned only finger tight.

The two mounting studs are located at the upper end of pivot arm 18 and the pivot pin 22 is positioned at the lower end of pivot arm 18. Pin 22 is fixed as by welding to the plate 26 and it extends forwardly from the plate so that the pivot arm is mounted in front of the plate 26 and the tube 24. At a point a short distance above pin 22, a bracket extends sidewardly, to the right in FIG. 2, and a locking lever 64 is pivoted by a pin 66 to that bracket. Thus arranged, the axis of pin 66 is substantially parallel to the axis of pin 22. The lever 64 extends generally laterally to the right so that gravity will tend to urge it to clockwise rotation. It rotates against a stop 68 which serves as a bolt for cooperation with keeper notches formed on the lower edge of the lever, one of which is designated by the numberal 70.

When the pivot arm 18 is rotated counterclockwise to lower the spare wheel, the lower edge of lever 64 slides across the stop 68 until one of the notches is opposite the stop. The stop lever will then fall down so that the stop 68, now serving as a bolt, falls into the keeper notch 70 or one of the other notches. In FIG. 6 the locking lever 64 is shown to have the latch 68 in the central one of its three keeper notches. By lifting the lever 64 and permitting arm 18 to be raised slightly or by forcing it down in small degree, the keeper can be made to engage one of the other notches so that the arm is locked in a position higher or lower than what is shown in FIG. 3.

An alternative to this lock is illustrated in FIGS. 4 and 5 where a locking plate 126 is welded to, and extendes downwardly from, the mid-region of a tube 124. The pivot arm 118 is mounted on the plate 126 by a pivot 122 which is closer to bar 124 than the pin 22 is close to tube 24 in FIG. 2. A locking pin 130 extends through a hole 132 in the lower end of the pivot arm 118 and engages in the lower opening of plate 122, as shown in FIG. 5, such that the arm 118 is held in vertical position. The plate is provided with three other openings 134 into which the pin 130 may be inserted when the arm 118 is rotated to near horizontal position. A number of pinning and locking arrangements may be employed. Pin 130 is one of that class of pins which includes a mechanism which prevents its being withdrawn until a member at the outer end of the pin is actuated. Use of such a locking device replaces not only the locking lever 64 and keeper 68, but it also replaces the chain operated bolt 36.

The counter weight spring 76 is housed within the tube 24. One of its ends is pinned to one end of the tube by a pin 78. In this case the pivot arm 18 is to pivot so that its upper end moves toward the left. Therefore, the left end of the spring 76 is pinned to the left end of tube 24. The other end of spring 76 is fixed to the loop end 80 of a cable 82 which extends through the tube 24 and emerges from its right end where it is reaved over a pulley 84. The pulley turns on an axle 86 which is welded to the tube 24. The tube is notched to provide clearance so that the pulley may rotate. The other end of the cable 82 terminates in a loop 88 which is hooked in a hookeye 90. That hookeye shank extends through an opening in arm 18 and is prevented from pulling through the opening by a nut threaded on its end. The shank extends, in this case, through the central one of three openings through the arm 18. Those openings are indicated by dashed lines. Moving the hook so that it extends through the lower opening results in lesser extension of spring 76 as the arm 18 is rotated from first to second position. On the other hand, moving the hookeye to the upper of the three holes increases the degree of extension of spring 76 per unit of rotation of the arm 18. By this simple expedient, the amount of counter weight force may be adjusted to properly counterbalance spare wheels of different weight. Thus, one device is made applicable to a number of different vehicles which have spare wheels of different weight.

The hookeye extends through arm 18 at a point between the axis of pivot pin 22 and the mounting means by which the spare wheel is mounted on the arm. The spring force is exerted between the hookeye 90 and the pulley 84 so that the hook is pulled toward the pulley 84 which, as previously explained, is mounted at a substantial distance to one side of the vertical position of arm 18. This arrangement permits the use of a spring 76 which is longer than the distance from the hookeye 90 to the pulley 84. A longer spring may be made mechanically strong while having a spring rate lower than a shorter spring of equal mechanical strength. The result is that a smaller mechanical advantage may be employed and the spring is stressed less and longer spring life can be expected.

As the arm 18 is rotated, spring 76 becomes extended. Cable length is adjusted so that the spring is stretched somewhat when arm 18 is in first position to insure against arm movement when bolt 36 is first retracted. A relatively large force is required for the beginning part of that rotation, but as the arm is rotated an ever larger percentage of the wheel's weight is borne by the spring. Eventually, if the hookeye 90 has been inserted in the appropriate one of the openings of the arm 18, the arm will have reached a near horizontal position in which the force of the spring is nearly equal to the weight of the wheel. When the arm is rotated that far, the cable 82 will have come to rest upon a second pulley 92 at the upper end of plate 26. Pulley 92 is mounted on an axis parallel with the axis of pivot 22. Further rotation of arm 18 after the cable 82 has engaged pulley 92 will result in a bending of the cable 82 at the pulley 92 such that the cable pulls the arm 18 with a force that has a substantial upward component. That alters the "purchase" or mechanical advantage. Increased force is required to rotate the arm 18 below this point. That arrangement permits use of a less powerful spring and it also insures that downward motion of the arm and spare tire will be slowed as the tire approaches ground level. Also, it insures that a force is available to overcome inertia effect during the first part of arm motion when raising the arm and spare wheel.

In this embodiment the second point, pulley 84, can be described as lying in a plane that is perpendicular to the plane of arm 18 rotation and which intersects arm 18, when the arm is in first position, at a point between the pivot 22 and the mounting means. The third point, pulley 92, can be described as lying substantially in the plane of arm rotation at a point closer to the arm when in first position than does the second point.

Although we have shown and described certain specific embodiments of our invention, we are fully aware that many modifications thereof are possible. Our invention, therefore, is not to be restricted except insofar as is necessitated by the prior art.

We claim:

1. A spare wheel handling device comprising in combination:

a first member including mounting means for mounting a wheel;

a second member capable of being attached to and carried by a vehicle;

said first member being pivotally mounted at a pivot point, removed from said mounting means, on said second member such that said first member may be rotated relative to said second member from a first position to a second position;

biasing means for biasing said first member toward said first position and away from said second position;

means for selectively locking said first member in said first position and in said second position against movement relative to said second member;

said biasing means comprises a tension spring connected between said first and second members such that said spring is stretched in a degree that increases upon rotation of said first member from said first position to said second position and that decreases upon rotation of said first member from second to first position;

the tension exerted by said spring being exerted between a first point on said first member intermediate said pivot point and said mounting means, and a second point on said second member, said second point lying in a plane which is parallel to the plane of movement of said first member and at one side of said first member when said first member occupies said first position;

said second point of attachment lying on a second plane perpendicular to the first plane and to said first member when in first position, said second plane intersecting said first member, when in said first position, at a point intermediate said pivot point and said mounting means; and a third point lying substantially in said plane first mentioned at a distance less far removed from said first member when in first position;

the tension exerted by said spring being exerted between said first point and said third point on said second member when said first member is rotated more than a given degree from its first position toward its second position whereby the rate at which said spring is stretched in increased with degree of rotation from first to second position more than said given degree.

2. A spare wheel handling device comprising in combination:

a first member including mounting means for mounting a wheel;

a second member capable of being attached to and carried by a vehicle;

said first member being pivotally mounted at a pivot point, removed from said mounting means, on said second member such that said first member may be rotated relative to said second member from a first position to a second position;

biasing means for biasing said first member toward said first position and away from said second position;

means for selectively locking said first member in said first position and in said second position against movement relative to said second member;

said first member being arranged for pivotal movement through an arc approaching a quarter circle whereby said mounting means may occupy a position above said pivot point in the first position of said first member and may occupy a position at one side of said pivot point in said second position of said first member;

said biasing means comprising a spring means for attaching the spring to a first point on a first member and to a second point on the second member such that force is variable with the degree of rotation stored in the spring when first member is rotated from first to second position; and means for increasing the rate at which force is stored for a given incremental degree of rotation of said first member following a given degree of said rotation which comprises a third point on said second member and means for applying the spring force between said first point and said third point as an incident to rotation of said first member in more than said given degree.

3. A spare wheel handling device comprising in combination:

a first member including mounting means for mounting a wheel;

a second member capable of being attached to and carried by a vehicle;

said first member being pivotally mounted at a pivot point, removed from said mounting means, on said second member such that said first member may be rotated relative to said second member from a first position to a second position;

biasing means for biasing said first member toward said first position and away from said second position;

means for selectively locking said first member in said first position and in said second position against movement relative to said second member;

said biasing means comprising a tension spring connected between said first and second members such that said spring is stretched in a degree that increases upon rotation of said first member from said first position to said second position and that decreases upon rotation of said first member from second to first position;

the tension exerted by said spring being exerted between a first point on said first member intermediate said pivot point and said mounting means, and a second point on said second member, said second point lying in a plane which is parallel to the plane of movement of said first member and at one side of said first member when said first member occupies said first position;

said second member being elongated and including means for mounting said second member on a vehicle in substantially horizontal position;

said first member comprising an arm having said mounting means located at one end and having pivotal connection at its opposite end to said second member;

said locking means comprising means for locking said arm such that it extends vertically in said first position and for locking said arm such that it extends horizontally in said second position;

said biasing means further comprising a flexible member fixed at one end to said arm at an intermediate point along its length;

said spring having one end connected to said second member and having a further end connected to the other end of said flexible member;

said biasing means further comprising a pulley fixed to said second member near one of its ends;

said spring being connected to said second member near the other of its ends; and said flexible member comprising a cable extending from said spring over said pulley to its connection on said first member.

4. The invention defined in claim 3 in which said second member comprises a tube, said spring being disposed within said tube.

5. The invention defined in claim 3 in which said mounting means comprising a pair of threaded studs extending from spaced points on said first member in like direction substantially parallel to the axis of rotation of said first member relative to the second member; and a clamp and wing nut mounted on that one of said studs which is closest to said axis whereby said one stud will extend through the center opening of a wheel hung on the other stud by one of the mounting bolt holes of the wheel.

* * * * *